(12) United States Patent
Jersild (10) Patent No.: US 11,687,176 B2
(45) Date of Patent: *Jun. 27, 2023

(54) METHODS AND APPARATUSES FOR PRODUCING SMOOTH REPRESENTATIONS OF INPUT MOTION IN TIME AND SPACE

(71) Applicant: IMMERSION NETWORKS, INC., Renton, WA (US)

(72) Inventor: Joshua Jersild, Bothell, WA (US)

(73) Assignee: IMMERSION NETWORKS, INC., Renton, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/691,672

(22) Filed: Mar. 10, 2022

(65) Prior Publication Data

US 2022/0197404 A1 Jun. 23, 2022

Related U.S. Application Data

(63) Continuation of application No. 16/960,815, filed as application No. PCT/US2019/012512 on Jan. 7, 2019, now Pat. No. 11,281,312.

(60) Provisional application No. 62/614,832, filed on Jan. 8, 2018.

(51) Int. Cl.
*G06F 3/038* (2013.01)
*G06F 3/0346* (2013.01)

(52) U.S. Cl.
CPC ............ *G06F 3/038* (2013.01); *G06F 3/0346* (2013.01)

(58) Field of Classification Search
CPC ............................... G06F 3/038; G06F 3/0446
USPC .......................................................... 345/174
See application file for complete search history.

(56) References Cited

U.S. PATENT DOCUMENTS

| | | | | |
|---|---|---|---|---|
| 5,598,182 A * | 1/1997 | Berend | ................. | G06T 11/001 345/441 |
| 6,768,446 B2 * | 7/2004 | Tamatsu | ................ | G01S 13/931 342/107 |
| 10,783,224 B2 * | 9/2020 | Lyske | ..................... | H04L 63/10 |
| 2002/0183960 A1 * | 12/2002 | Chiou | ................... | G01S 5/0294 702/150 |
| 2020/0005076 A1 * | 1/2020 | Dill | ........................... | A63J 5/02 |

\* cited by examiner

*Primary Examiner* — Prabodh M Dharia
(74) *Attorney, Agent, or Firm* — Christopher J. Rourk; Jackson Walker LLP (57) ABSTRACT

The present invention provides a method and apparatus that are directed to accepting a plurality of positional data with corresponding times of the motion, determining one or more continuous positional functions that together represent an approximation of path of the positional data, and determining, for each positional function, one or more time functions that together represent an approximation of the times for the positional data corresponding to the positional functions.

20 Claims, 10 Drawing Sheets

METHODS AND APPARATUSES FOR PRODUCING SMOOTH REPRESENTATIONS OF INPUT MOTION IN TIME AND SPACE

RELATED APPLICATIONS

The present application is a continuation of U.S. patent application Ser. No. 16/960,815 filed Jul. 8, 2020, which claims benefit of and priority to International Application No. PCT/US2019/012512, filed Jan. 7, 2019, which claims priority to and benefit of U.S. Provisional Patent Application No. 62/614,832, filed Jan. 8, 2018, each of which is hereby incorporated by reference for all purposes, as if set forth herein in its entirety.

TECHNICAL FIELD

The present invention relates to the field of user input of motion for computer processing, and more particularly to representing input motion smoothly in time and in space, with efficient use of storage space or communication resources.

BACKGROUND ART

Many approaches have been described for generating smooth paths along a plurality of points, however, these solutions do not typically include any concept of movement along the curve (that is, there is no time component). Solutions that do end up defining movement along the curve do so by defining a series of keyframes, where the position element is simply the distance along the curve, either in terms of linear distance, or in terms of the parameterization value (typically a 0 to 1 value where 0 is "start of curve" and 1 is "end of curve"). However, this still requires a relatively dense amount of key times, and the actual velocity is not particularly smooth.

There is a need for methods and apparatuses that can accept user input of motion, noisy in terms of position and time, and can create a representation of that user input of motion that is both a smooth path in term of position and a smooth path in terms of time or motion along the path. In some applications, the ability to provide an adjustable level of smoothness to accuracy is also desirable. There is also a need for methods and apparatuses that can represent time-based motion smoothly and with efficient use of storage and communications resources.

SUMMARY

The present invention provides methods and apparatuses that accept user input of motion (e.g., an audio source, a motion tracker, etc.) and produce a representation of the motion smoothly and compactly. Specifically, given a sequence of recorded or generated positions at specific times, the present invention determines a representation comprising a sequence of curves that describe not only the path of the object through space, but also the speed of movement of that object along its path. The representation can provide more desirable smooth representation, and more compact storage and communication, than previous approaches.

An embodiment of the present invention provides a method for determining a smooth representation of a motion of an input device, which method comprises accepting a plurality of positional data with corresponding times of the motion; determining one or more continuous positional functions that together represent an approximation of path of the positional data; and determining, for each positional function, one or more time functions that together represent an approximation of the times for the positional data corresponding to the positional functions.

An embodiment of the present invention provides a method that comprises dividing the positional data into two or more subsets; and determining one or more continuous positional functions for each of the subset, wherein the continuous positional functions together represent an approximation of path of the subset.

An embodiment of the present invention provides a method that comprises calculating one or more parametric transforms of the corresponding positional data for the positional functions.

An embodiment of the present invention provides a method that each of the time functions maps the parametric transforms of the positional data for the corresponding positional functions and the corresponding times within a range specified by a start time and an end time.

An embodiment of the present invention provides a method that the positional data is a representation of position, motion, orientation, or a combination thereof, of the input device.

An embodiment of the present invention provides a method that comprises the time corresponding to the positional data is a representation of time corresponding to the input device at that position.

An embodiment of the present invention provides an apparatus for determining a smooth representation of a motion, which comprises an input device, configured to generate motion signals defined by a plurality of positional data with corresponding times; and a computer system, configured to accept the motion signals generated by the input device; determine one or more continuous positional functions that together represent an approximation of path of the positional data; and determine, for each positional function, one or more time functions that together represent an approximation of the times for the positional data corresponding to the positional functions.

An embodiment of the present invention provides an apparatus that comprises a computer system, which is configured to divide the positional data into two or more subsets; and determine one or more continuous positional functions for each of the subset, wherein the continuous positional functions together represent an approximation of path of the subset.

An embodiment of the present invention provides an apparatus that comprises a computer system, which is configured to calculate one or more parametric transforms of the corresponding positional data for the positional functions.

An embodiment of the present invention provides an apparatus that comprises a computer system and each of the time functions determined by the computer system maps the parametric transforms of the positional data for the corresponding positional functions and the corresponding times within a range specified by a start time and an end time.

An embodiment of the present invention provides an apparatus that comprises an input device, and the positional data generated by the input device is a representation of position, motion, orientation, or a combination thereof, of the input device.

An embodiment of the present invention provides an apparatus that comprises an input device, and the time corresponding to the positional data generated by the input device is a representation of time corresponding to the input device at that position.

DESCRIPTION OF EMBODIMENTS AND INDUSTRIAL APPLICABILITY

Figure 1:
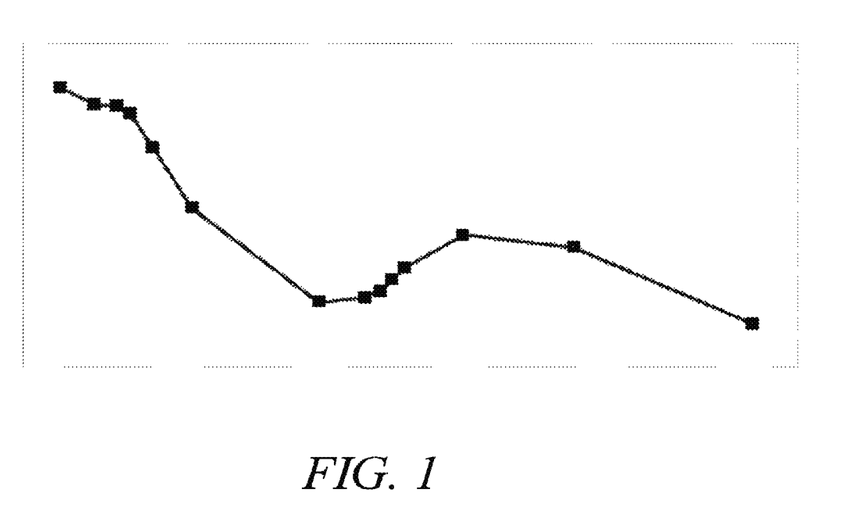
FIG. 1 is a schematic illustration of linearly interpolated keyframe positions.

In computer animation and similar fields, animations are typically stored as a sequence of keyframes, each of which is a specific position (or rotation, or other transformation) at which the animated object will be at a specific time during the animation. These keyframes can be interpolated to provide a smoother apparent motion. FIG. 1 is a schematic illustration of linearly interpolated keyframe positions.

A smooth representation of motion is generally understood in the art to be observed as a natural-looking representation of a change in position of an object over time. An acceptably smooth representation can be understood as the movement of the object from one state to the next state having an amount of jitter along its path in both time and space that is below an acceptable maximum amount.

Figure 2:
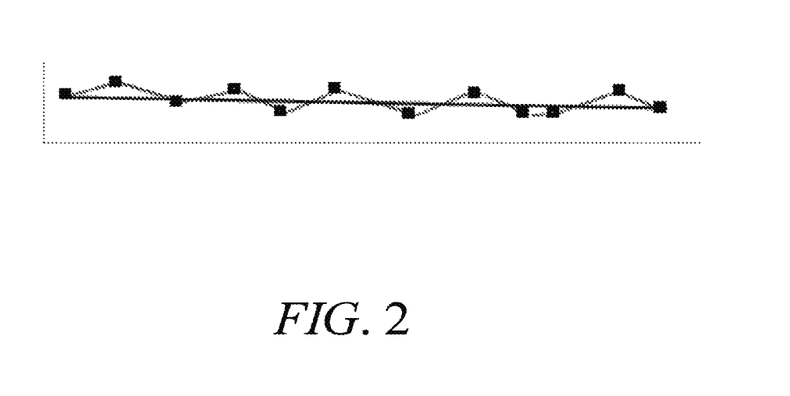
FIG. 2 is a schematic illustration of noisy keyframes along a desired path.

Describing complex motions tends to require many keyframes. For instance, if a motion-capture system captures keyframes at 30 hz or more, which means for a minute of animation from the system, there are at least 1800 keyframes to store. Additionally, due to measurement error or muscle jitter, the keyframe positions (as well as the speed of motion) can be noisy, which is frequently undesirable. FIG. 2 is a schematic illustration of noisy keyframes along a desired path.

Figure 3:
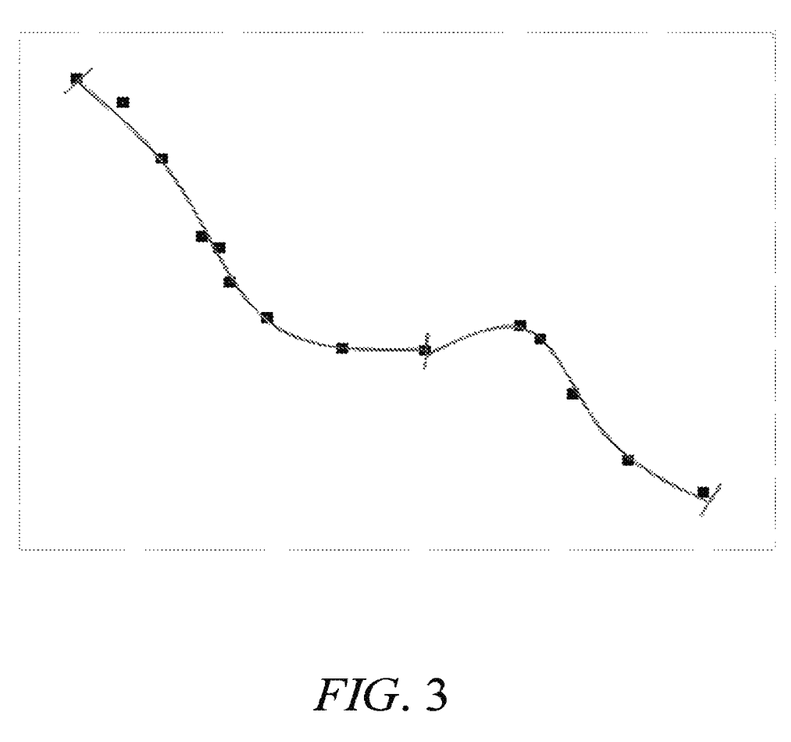
FIG. 3 is a schematic illustration of a sequence of points represented by a sequence of curves.

In some applications, a smooth path can be created from taking a sequence of sampled points. For instance, computer illustration programs use a sequence of sampled mouse pointer positions as input to a curve generation algorithm, presenting the user with a smoothed version of the brush stroke they were attempting to draw. FIG. 3 is a schematic illustration of a sequence of points represented by a sequence of curves.

Figure 4:
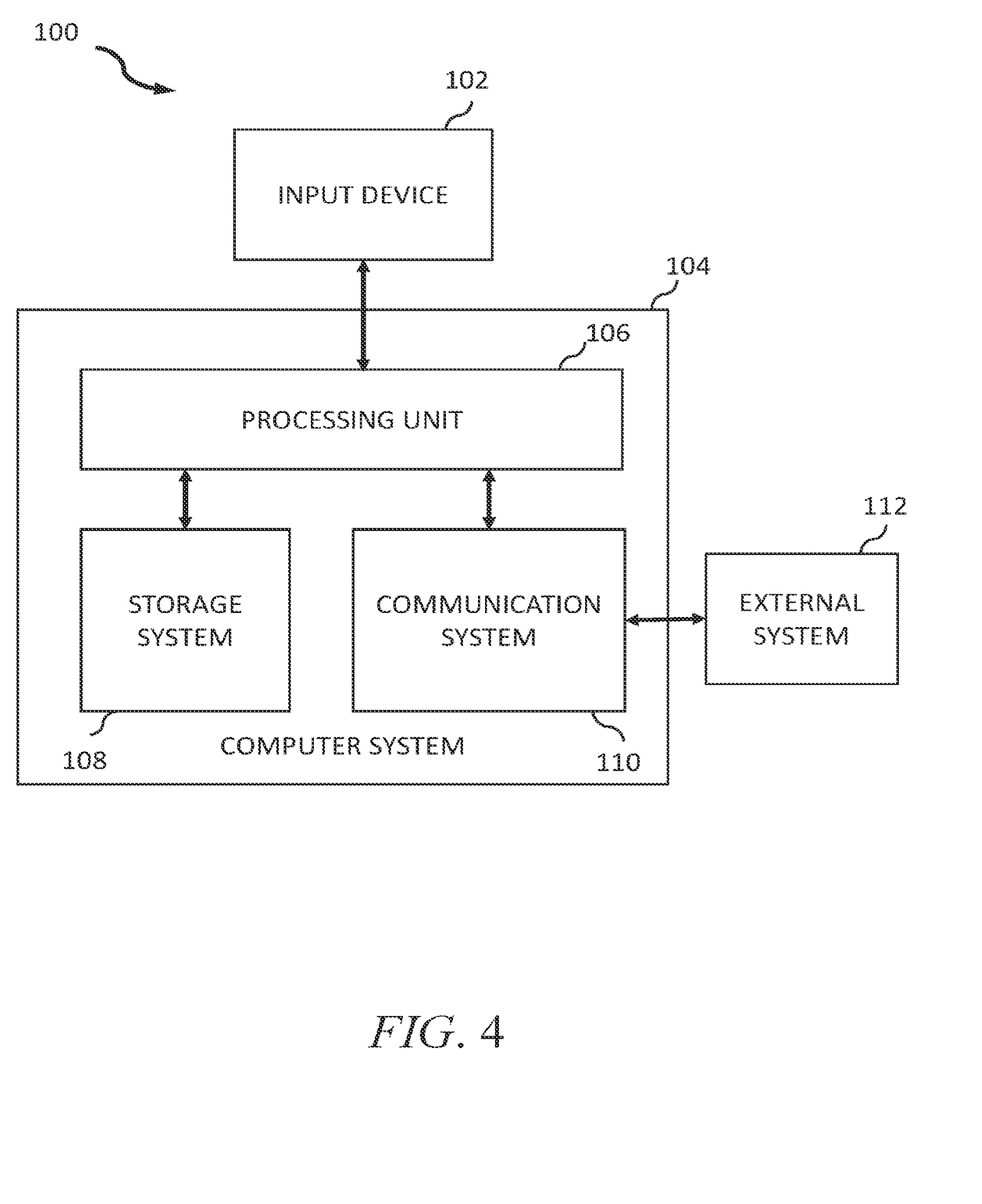
FIG. 4 is a schematic illustration of an apparatus according to the present invention.

FIG. 4 is a schematic illustration of an apparatus 100 according to the present invention. The apparatus 100 can comprise an input device 102, a computer system 104. The computer system 104 is a general-purpose computing device and is not intended to suggest any limitation as to scope of use or functionality. The computer system 104 can include, but is not limited to, one or more processing units 106, a storage system 108, and a communication system 110. The computer system 104 can communicate with one or more input devices 102, as examples, a conventional computer input mouse, a pointing device such as a pen or stylus, a motion tracking system such as those used in contemporary video games, a head tracking system such as those used in contemporary virtual reality systems.

The input device 102 can provide signals representative of position to a processing unit 106. The processing unit 106 can comprise a personal computer, smartphone or tablet, cloud-based computing resources, special purpose hardware processing system, or other systems known to those skilled in the art. The position signals can be representative of position in one or more physical dimensions in various coordinate systems, of physical orientation or rotation about one or more axes, or combinations thereof. The processing unit 106 can be configured to determine a compact, smooth representation of the motion of the input device 102 from the position signals over time.

Physical translation in three-dimensional space is assumed for convenience of the description herein, but rotation, rotation combined with translation, and any other representation of motion can also be accommodated in the present invention. The compact, smooth representation can be stored in a storage system 108, such as RANI, disk drives, solid state storage, or cloud-based storage, for later use.

The compact, smooth representation can also be communicated to one or more external systems 112 via communication system 110. The external system 112 can be, for example, motion output devices to control smooth motion thereof, or remote operation of equipment, or remote display of the motion of the input device, or other computing systems to allow integration of the motion with other functions such as audio mixing, virtual painting or sculpting, or avatar control in a virtual reality system, augmented reality system, or computer game. It should be noted that the computer system 104 can also be coupled to a network, such as the Internet, and can be operable to send and receive data to and from other systems on the network.

Figure 5:
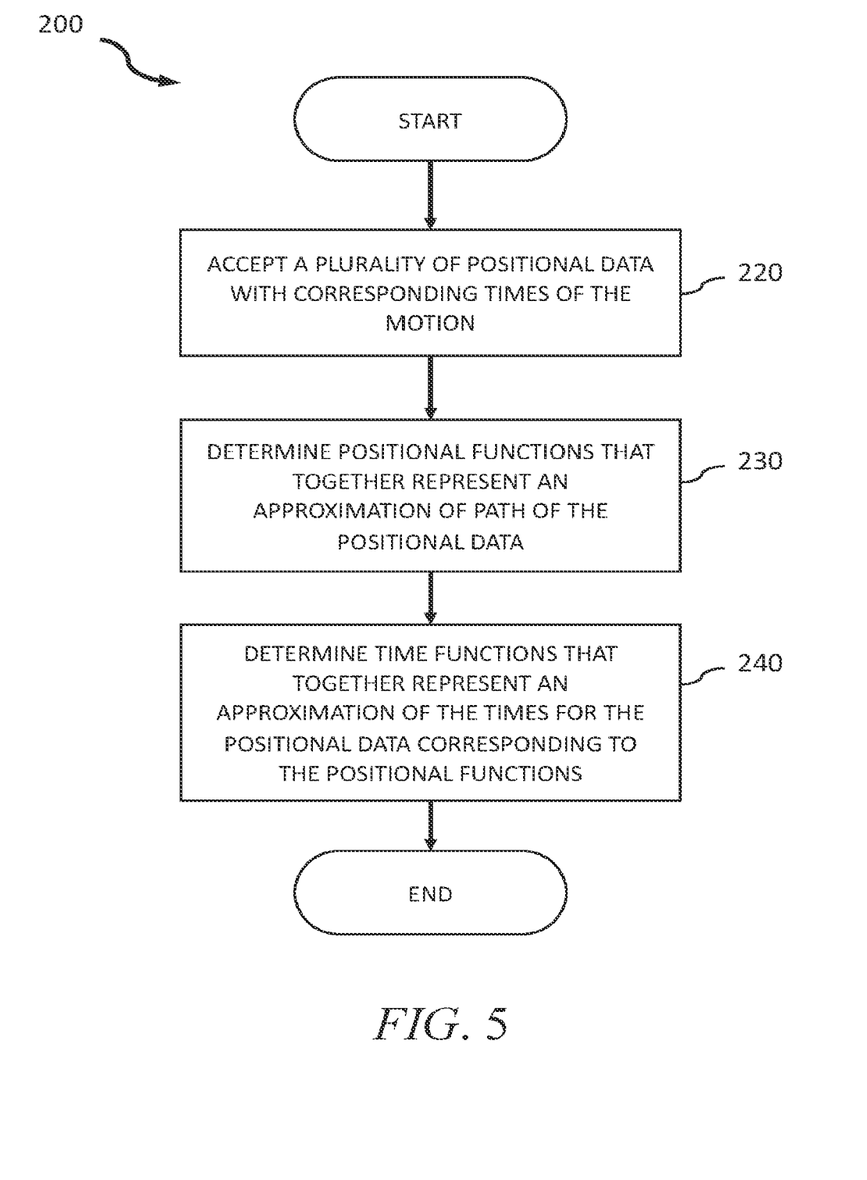
FIG. 5 is a schematic illustration of a method according to the present invention.

FIG. 5 is a schematic illustration of a method 200 according to the present invention. In step 220, a sequence of input keys represented by a plurality of positional data with corresponding times of the motion can be accepted by a computer system. The positional data can be input transforms of various forms, including, as examples, simple positional data in N dimensions, rotation angles, object scales, quaternions, values or changes in any of the preceding, etc. The times can be specified in any unit of time or corresponding to time in some way, including, as examples, seconds, milliseconds, audio samples, velocities, accelerations, values or changes in any of the preceding, etc. Typically, the transformation/time inputs are in increasing-time order for simplicity, although this isn't strictly a requirement.

In step 230, one or more positional functions that together represent an approximation of path of the positional data can be determined. In this step, only the position component is utilized to generate the positional curve. The time component can be ignored for now, except as an explicit ordering.

The list of input transforms with associated times keys are referred to herein as P[i] and T[i], where P is the list of transforms, T is the list of associated times, and i is the index into each of them used to associate transform values and time values. In step 230, the P[i] transform information can be used to generate a sequence of one or more transform curves that approximate the path described by P[i]. This can be done with a variety of curve-fitting methods, and with a variety of curve types, examples including circular arcs, bezier curves, b-splines, and others known to those skilled in the art or that might be later developed. Each generated curve is represented as a continuous function F(u), where u is the parameterization of the curve with minimum and maximum values $U_{min}$ and $U_{max}$ (which are traditionally 0 and 1, respectively), between which the curve approximates the path implied by the supplied input keys.

In step 240, for each generated positional function, one or more time functions are determined, wherein the time functions together represent an approximation of the times for the positional data corresponding to the positional functions. That is, a sequence of time curves (G) can be generated, each of which corresponds to one of the F transform curves. The G time functions can be used to map any time within the range of $T[i_{min}]$ and $T[i_{max}]$ to a transform that was approximately on the path implied by the supplied input keys, at approximately the specified time.

Figure 6:
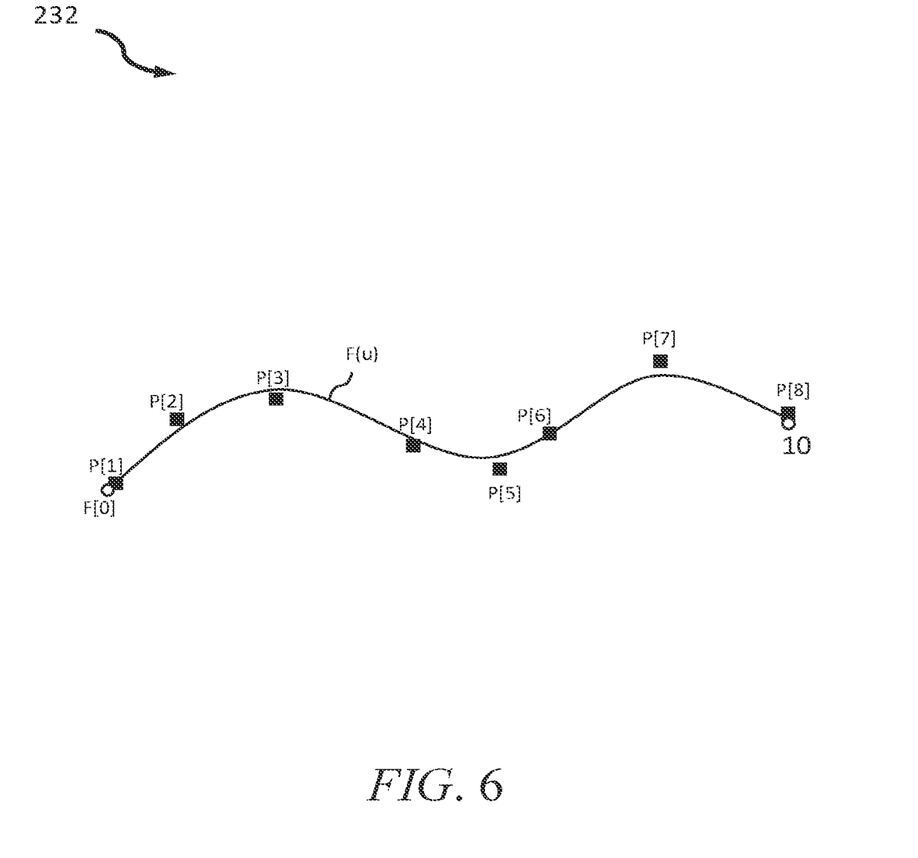
FIG. 6 is a schematic illustration of P[i] and F[u] for an example, simplified set of positional data.

FIG. 6 is a schematic illustration of P[i] and F[u] for an example, simplified set of positional data. Some sets of keys, or P[i], might not yield an acceptable fit with a single curve. The path can be subdivided into two or more subsets. As an example, a path represented by P[i], with an index i in the range from 1 to n, can be subdivided into a first path P1[i], index i from 1 to m, and a second path $P_2$[i], index i from m to n. A first continuous function $F_1$[u] can be determined to represent the first path $P_1$[i]; while a second continuous function $F_2$[u] can be determined to represent the second path $P_2$[i]. The functions $F_1$ and $F_2$ can be constrained to realize an acceptably smooth representation of the path, for example by constraining their corresponding endpoints such that $F_1[1]=F_2[0]$, or by constraining their derivatives such that $F_1'[I]=F_2'[0]$.

Figure 7:
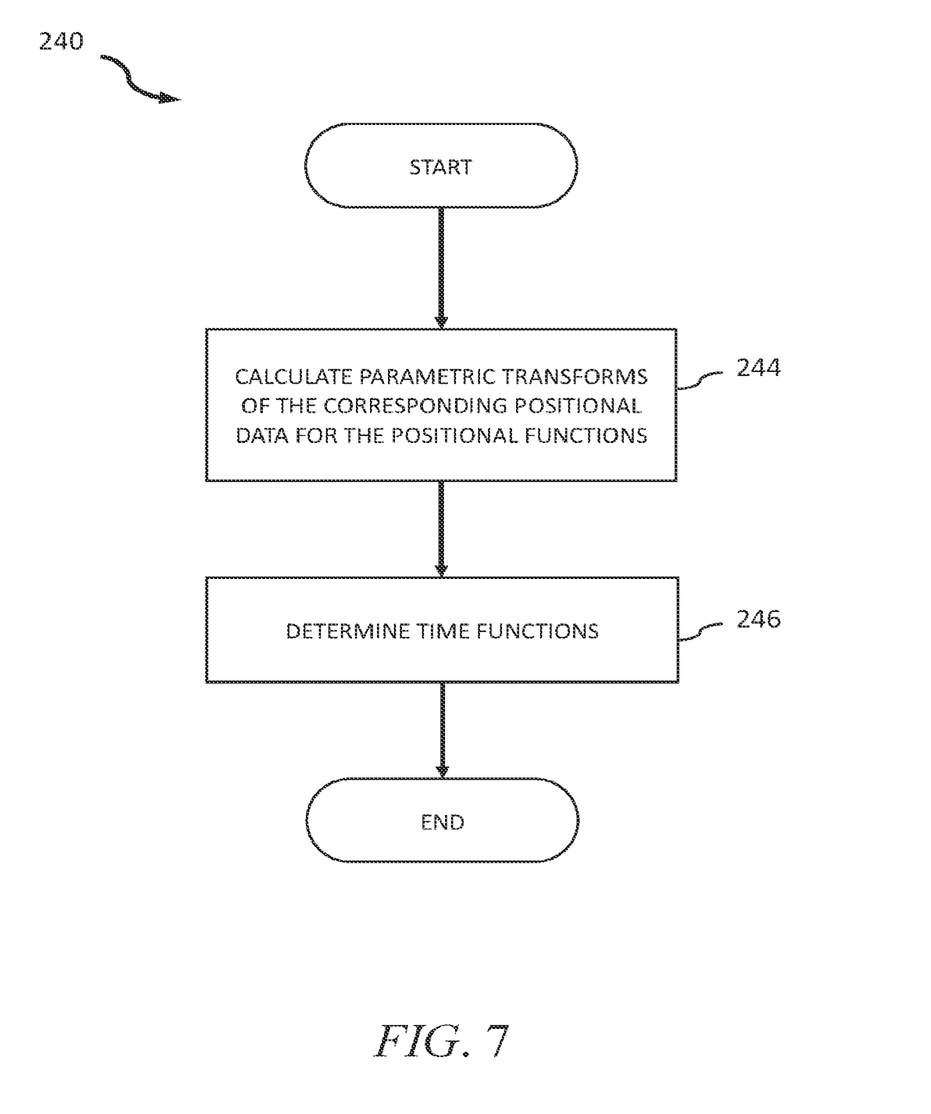
FIG. 7 is a schematic illustration of a method according to the present invention.

FIG. 7 is a schematic illustration of a method according to the present invention. More specifically, FIG. 7 is a detailed illustration of step 240 for determining time functions. In step 244, for each positional function (F) that is generated, we calculate the parameterization (u value) of the corresponding input transform keys (P[i]) for the positional function. That is, we need to solve: U[i]=u, where F(u) is the nearest corresponding curve position to P[i].

The actual form to solve the above depends on which type of curve is used. For a polynomial curve, for instance, one would want to solve for or approximate the nearest point on the polynomial F(u) to the point P[i], with the added constraint that U[i−1]≤u[i]≤U[i+1]), but it is generally a straightforward algebraic process.

Once this list (U[i]) is obtained, the list is then used as the input for a subsequent curve-fitting to generate time curves that map time to parametric transforms on transform curves, as shown in step 246. In this case, each output curve can be a function (G) that maps t (a time value inclusively between $T[i_{min}]$ and $T[i_{max}]$) to the parameterization (u) value of the position along F. Stated in a different way, G is generated such that F(G(T[i]))≈P[i] for every given value of i. G can be a single curve, or can be determined as several linked curves as described above for F. The curve fitting method of step 246, like the previous transform curve fit, can be done using many curve-fitting algorithms suitable for any type of 1-D curve (bezier, b-spline, etc.).

A sequence of one or more G time curves is generated in step 246, each of which corresponds to one of the F transform curves, which can be used to map any time within the range of $T[i_{min}]$ and $T[i_{max}]$ to a transform that was approximately on the path implied by the supplied input keys, at approximately the specified time, where the approximations allow smooth position and time representations.

In order to get such a transform ($p_t$) corresponding to a time t from above, the t value is used to find the corresponding F transform curve and G time curve for the time t. The solution can be done by finding the G time curve where t is within the range specified by the curve's associated $t_{start}$ (start time) and $t_{end}$ (end time). Then the G time curve is used with its corresponding F transform curve to determine the following: $P_t=F(G(t))$.

That is, at a given time, a G time curve can be determined, and its corresponding F transform curve is also determined. A u value can be determined by inputting time into its corresponding G time curve as output. Then the u value is used by being inputted into the F transform curve to get a sequence of smooth representation of positions associated with time.

It should be noted that in various embodiments one or more steps can be performed in a different order than shown, or can be omitted, as desired. Additional steps can also be performed as desired.

Embodiments of the present invention allow both the transform and time components to be stored and communicated as a series of curves, which require considerably less storage compared to the usual method of storing many individual keyframes. In an example use case, on average a roughly 100× reduction in the amount of data is needed to store the curves, as compared with storing all of the recorded keys; and a roughly 33× reduction in data as compared with generating smooth curves for the position data and then keeping the time components of each key.

Smoothing out time as well as position has been found to be desirable for representing velocity/acceleration changes that are pleasing to the user, because it enables the removal or reduction of sudden-but-temporary extreme changes in velocity that are undesirable (for instance, friction momentarily stopping a finger that is trying to trace a smooth motion along a touchscreen, or the user quickly picking up and moving a mouse from one end of the mouse pad to the other, resulting in a momentary stop in a recorded motion). These unwanted changes are difficult to automatically remove with other methods, typically requiring some additional, time-consuming manual correction.

The smoothing parameters can be independently specified, as well, with different thresholds for each component, getting the desired ratio of accuracy to smoothness in each component independently.

Figure 8:
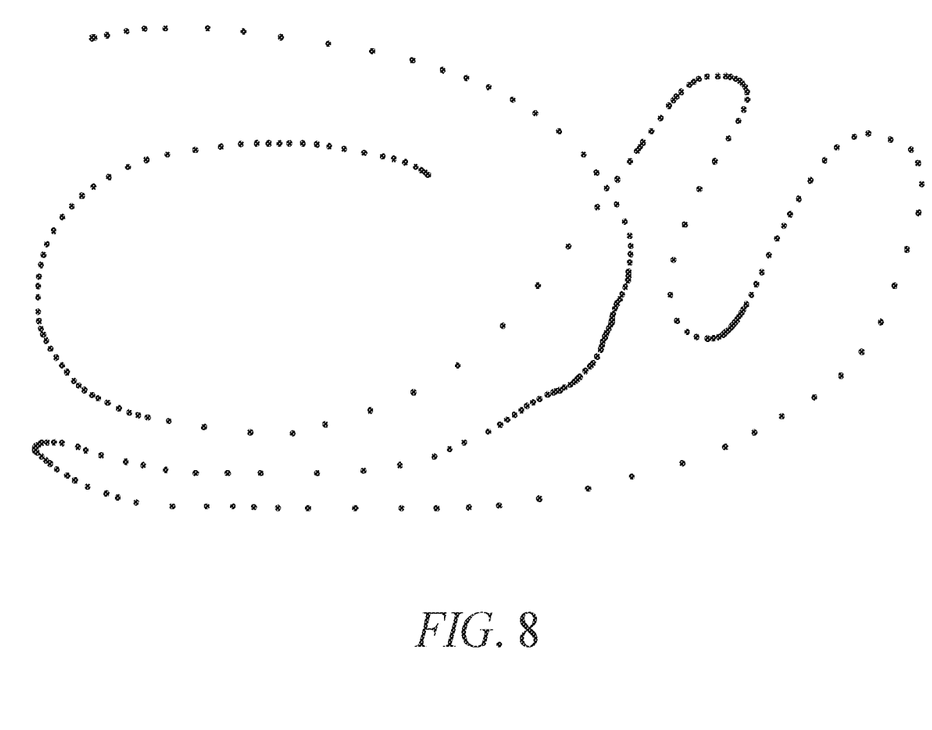
FIG. 8 is a schematic illustration of a simple single two-dimension path of a sequence of input keys. For readability, only every fourth point is shown.

FIG. 8 to FIG. 11 show an example illustration of a smoothed representation of input motion used with a simple two-dimensional path, according to the present invention. FIG. 8 is a schematic illustration of a simple single two-dimension path of a sequence of input keys. For readability, only every fourth point is shown. FIG. 8 shows the actual movement as it was captured: one point every 1/60th of a second. For this example, 1082 separate points (and corresponding times) were captured. By way of example only, every fourth point is displayed in the figure, because otherwise it would be dense and difficult to read clearly.

Figure 9:
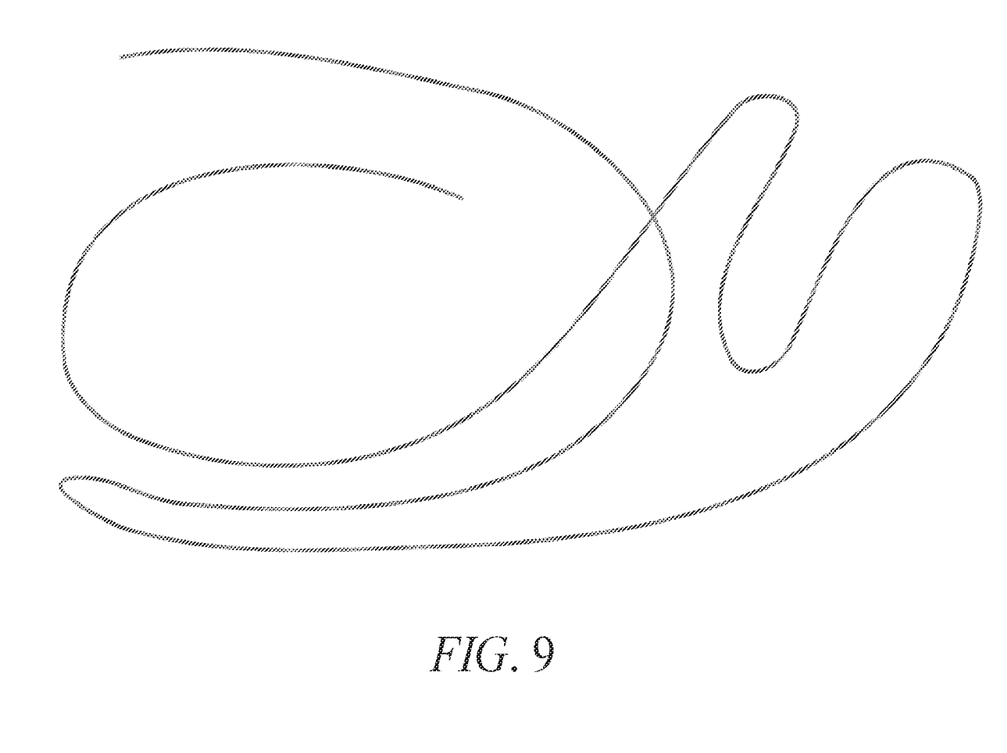
FIG. 9 is a schematic illustration of a sequence of curve representation generated from the input keys, according to the present invention.

FIG. 9 is a schematic illustration of a sequence of curve representation generated from the input keys, according to the present invention. A positional curve sequence is generated using the positions P[i] given by the input keys, resulting in FIG. 9. The positional curve approximates the path implied by the supplied input keys. During this process, generating multiple curves can be desired to allow for a better approximation of the path, the supplied input position points can be divided into several subsets. A curve fitting method can be used to provide the desired result into a sequence of curves, each of which is represented as a continuous function.

Figure 10:
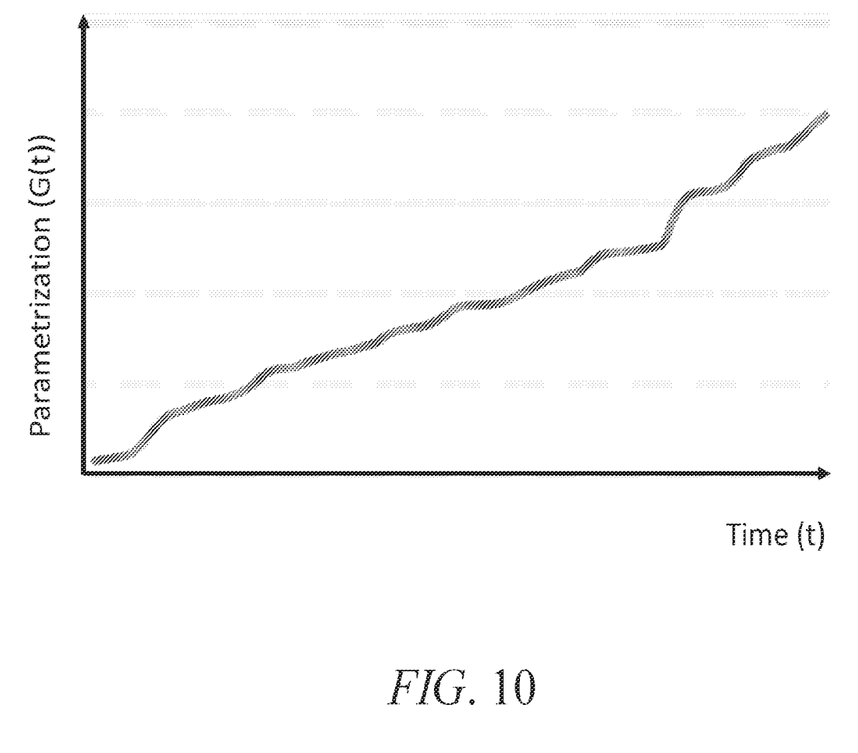
FIG. 10 is a schematic illustration of a 1-D time curve data generated from the input keys, according to the present invention.

FIG. 10 is a schematic illustration of a 1-D time curve data generated from the input keys, according to the present invention. The parameterization of the positional curve (G(t)) is shown as a function of input time. The time curve sequence is then created, and this is a mapping from linear input time (that is, increasing time as the motion occurs) into the parametric value along the position curve.

Figure 11:
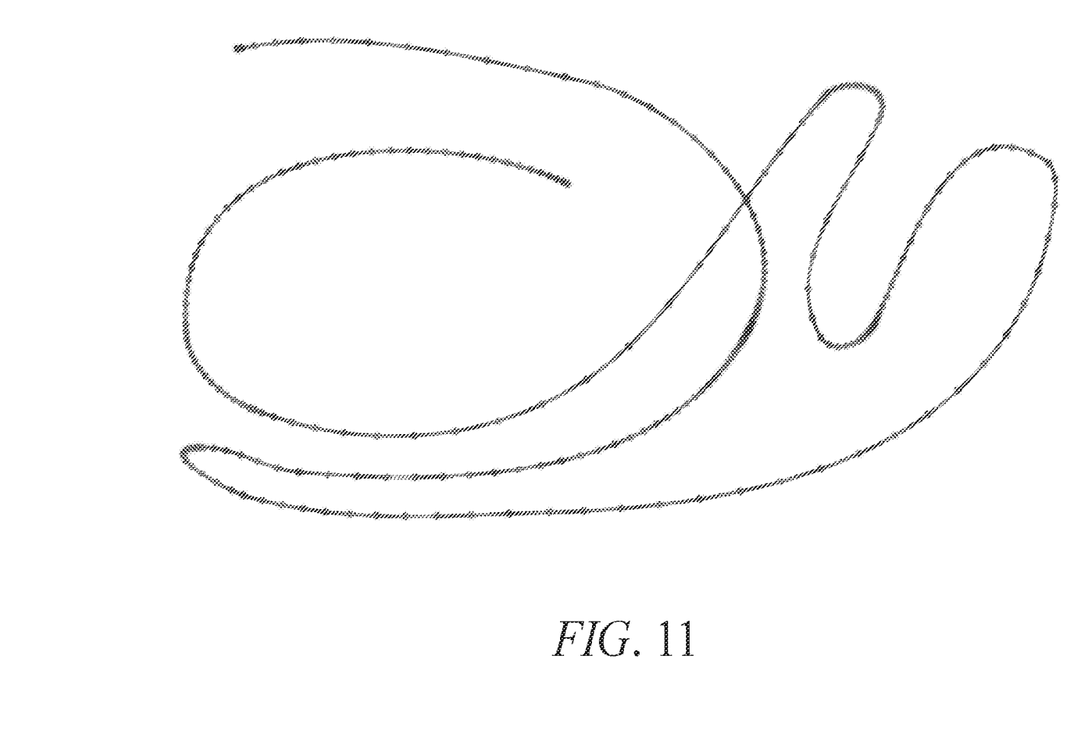
FIG. 11 is a schematic illustration of smoothed representation of input keys according to the present invention.

FIG. 11 is a schematic illustration of smoothed representation of input keys according to the present invention. As shown in FIG. 11, the generated positional curve can be sampled with overlaid dots on it using the time curve of FIG. 10 at regular intervals. Each dot can represent $1/15^{th}$ of a second of the stored motion, as instance. As such, denser clusters of dots indicate slower motions. Note that, when comparing to FIG. 8, the same approximate speeds exist through the whole path. The speed changes in FIG. 11 are smoother than the recorded points of FIG. 8.

The entirety of this example ends up being stored as just 18 curves, which is a significant reduction in required storage while still presenting a desirable approximation of the user's initial input.

The present invention can be used in a variety of applications. As an example, the present invention allows the user to record a path along a touch-screen to record the motion of an audio source in an audio mixing user interface (UI), where the path of the motion of the audio source can be a smoothed path representing acceleration changes. The present invention can also be used in tracking and storing the 3D motion of a motion controller in virtual reality or augmented reality environment. The present invention can provide efficient storage of the process of painting a piece of digital art, for reproduction of the actual digital brush strokes in motion. In a racing video game, racing lines for cars can be represented smoothly.

Implementation. Methods according to the present invention can be implemented in computer programs. Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus can include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of a special-purpose computer, programmable data processing apparatus, processor, processor architecture, and so on.

A computer can include a computer-readable storage medium and this medium can be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the systems as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof can be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions can include computer executable code. A variety of languages for expressing computer program instructions are possible, including without limitation C, C++, Java, JavaScript, assembly language, Lisp, HTML, Perl, and so on. Such languages can include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads can be processed more or less simultaneously to enhance utilization of the processor and to facilitate substantially simultaneous functions. By way of implementation, any and all methods, program codes, program instructions, and the like described herein can be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. It is possible to modify or customize general-purpose systems to be used with programs in accordance with the teachings herein, or it might prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages can be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware specialized through computer instructions; and so on—any and all of which can be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations can depict a step, or group of steps, of a computer-implemented method. Further, each step can contain one or more sub-steps. For the purpose of illustration, these steps (as well as any and all other steps identified and described above) are presented in an order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described can be utilized and presented in a multitude of languages. Individual systems can be presented in one or more languages and the language can be changed with ease at any point in the process or methods described above. One of ordinary skill in the art would appreciate that there are numerous languages the system could be provided in, and embodiments of the present invention are contemplated for use with any language.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A method for determining a smooth representation of a motion of an input device, comprising:
   receiving a plurality of positional data for an audio source at a processor, each positional data having an associated input transform and time data;
   determining with the processor one or more continuous positional functions that output an approximation of the positional data; and
   determining with the processor one or more time functions that output an approximation of the associated time data.

2. The method of claim 1, further comprising:
   dividing the positional data into two or more subsets using the processor; and
   determining one or more continuous positional functions for each of the subsets using the processor, wherein the continuous positional functions output an approximation of each of the subsets.

3. The method of claim 2 wherein dividing the positional data into two or more subsets using the processor comprises:

determining a derivative of the continuous positional function for the plurality of position data; and dividing the positional data where the derivative of the continuous positional function for the plurality of position data for a first point is approximately equal to the derivative of the continuous positional function for the plurality of position data for an adjacent point to the first point.

4. The method of claim 1, wherein determining with the processor one or more time functions that output an approximation of the associated time data comprises calculating one or more parametric transforms of the positional data for the positional functions using the processor.

5. The method of claim 4, wherein each of the time functions maps the parametric transforms of the positional data for the corresponding positional functions and corresponding times within a range specified by a start time and an end time.

6. The method of claim 1, wherein the positional data is a representation of one or more a position, a motion and an orientation of the input device.

7. The method of claim 1, wherein the time associated with the positional data comprises a time corresponding to the input device at an associated position.

8. The method of claim 1 further comprising generating the positional data and the associated time data using the input device.

9. The method of claim 8 wherein generating the positional data and the associated time data using the input device comprises generating a series of positional data values, each positional data point having an associated time data value.

10. An apparatus for determining a smooth representation of a motion, comprising:

an input device, configured to generate a series of positional data values for an audio source, each positional data value having an associated input transform and time data value;

a computer system, configured to:

receive the series of positional data values and associated time data values;

determine one or more continuous positional functions that generate an approximation of the positional data values; and determine, for each positional function, one or more time functions that generate an approximation of the associated time data values for the positional data values.

11. The apparatus of claim 10, wherein the computer system is further configured to:

divide the series of positional data values into two or more subsets; and determine one or more continuous positional functions for each of the subsets, wherein the continuous positional functions generate an approximation of the positional data values of the at least one of the subsets.

12. The apparatus of claim 10, wherein the computer system is further configured to calculating one or more parametric transforms of the positional data values for the continuous positional functions.

13. The apparatus of claim 12, wherein each of the time functions maps the parametric transforms of the positional data for the corresponding positional functions and corresponding time data values within a range specified by a start time and an end time.

14. The apparatus of claim 10, wherein the positional data values comprise one or more of a position, a motion and an orientation of the input device.

15. The apparatus of claim 10, wherein the time data values correspond to the input device at an associated position.

16. The apparatus of claim 11 wherein dividing the positional data into two or more subsets comprises:

determining a derivative of the continuous positional function for the position data values; and dividing the positional data where the derivative of the continuous positional function for the plurality of position data for a first point is approximately equal to the derivative of the continuous positional function for the plurality of position data for an adjacent point to the first point.

17. A method for determining a smooth representation of a motion of an input device, comprising:

receiving a plurality of positional data for an audio source at a processor, each positional data having an associated input transform and time data;

determining with the processor one or more continuous positional functions that output an approximation of the positional data; and determining with the processor one or more time functions that output an approximation of the associated time data, wherein the positional data is a representation of one or more a position, a motion and an orientation of the input device and wherein the time associated with the positional data comprises a time corresponding to the input device at an associated position.

18. The method of claim 17, further comprising:

dividing the positional data into two or more subsets using the processor; and determining one or more continuous positional functions for each of the subsets using the processor, wherein the continuous positional functions output an approximation of each of the subsets.

19. The method of claim 17, wherein determining with the processor one or more time functions that output an approximation of the associated time data comprises calculating one or more parametric transforms of the corresponding positional data for the positional functions using the processor.

20. The method of claim 17 further comprising generating the positional data and the associated time data using the input device.

* * * * *